United States Patent
Krause

Patent Number: 5,927,687
Date of Patent: Jul. 27, 1999

[54] BALL VALVE

[76] Inventor: Ralf Krause, Eichenstrasse 6, D-47228 Duisburg, Germany

[21] Appl. No.: 08/937,653

[22] Filed: Sep. 24, 1997

[30] Foreign Application Priority Data

Sep. 25, 1996 [DE] Germany .......................... 196 39 282

[51] Int. Cl.$^6$ ..................................................... F16K 5/06
[52] U.S. Cl. .................................. 251/315.1; 251/315.08; 222/368
[58] Field of Search .......................... 251/315.08, 315.13, 251/315.1, 315.12, 315.14; 222/368

[56] References Cited

U.S. PATENT DOCUMENTS

| | | | |
|---|---|---|---|
| 1,524,585 | 1/1925 | Shutterly | 222/368 X |
| 2,816,693 | 12/1957 | Greaves et al. | 222/368 X |
| 3,109,623 | 11/1963 | Bryant | 251/315.08 X |
| 3,214,135 | 10/1965 | Hartmann | 251/315.08 X |
| 3,275,025 | 9/1966 | Kowalski | 251/315.08 X |
| 3,556,471 | 1/1971 | Paul, Jr. | 251/315.14 X |
| 4,441,524 | 4/1984 | Mese | 251/315.12 X |

*Primary Examiner*—John Fox
*Attorney, Agent, or Firm*—Watson Cole Grindle Watson, P.L.L.C.

[57] ABSTRACT

A ball valve for shutting off pipelines carrying liquid, gaseous and solids-laden media, particularly those of large nominal diameters, includes a housing containing a ball provided with at least one bore and supported in a rotatable fashion in the housing by means of a spindle, annular seals located before and after the ball in the direction of flow in the housing which seal off the inlet side from the outlet side, one additional annular seal which rests upon the surface of the ball in the housing in each of the planes perpendicular to the spindle axis above and below the bore, as well as above and below the seals which are placed before and after the ball in the flow direction, in such a way that each of the planes which are spanned by them and are parallel with each other is perpendicular to the planes spanned by the sealing rings placed before and after the ball.

7 Claims, 6 Drawing Sheets

FIG. I

BALL VALVE

BACKGROUND OF THE INVENTION

1. Field of the Invention

The invention relates to a ball valve for shutting off pipelines carrying liquid, gaseous and solids-laden media, particularly pipelines of large nominal diameter, the ball valve including a housing containing a ball having at least one bore therein and supported in a rotatable fashion in the housing by means of a spindle, and in which annular seals upstream and downstream of the ball in the direction of flow in the housing are provided for sealing off the inlet side of the ball from the outlet side when rotated to a closed position.

2. The Prior Art

Ball valves of this type are used as shut-off devices for liquid, gaseous and solids-laden media under pressure and under vacuum. The usual linear, circular passageway allows for the least possible flow resistance since the medium is carried in a smooth pipe. The sealing of the known ball valves is carried out by means of annular pistons, or often times, by means of sealing rings made of the most widely varied materials such as soft packings, ceramic, hard metal, etc.

These sealing rings are located in the housing immediately before (upstream of) and after (downstream of) the ball when viewed in the direction of flow. They seal the inlet side of the ball from the outlet side when the ball is in a shut-off position.

However, when the ball valve is opened, that is, when the ball is rotated by 90° from the shut-off position by means of the spindle, the ball surface will temporarily lose sealing contact with the sealing rings. Since the ball cannot be supported within the housing without some play, there are dead spaces between the ball and the housing wall which clog up with medium, which will flow between the sealing ring and the opening cutout of the bore when the valve is switched, until finally it is no longer possible to open and close the valve.

Various suggestions have been made for minimizing the dead spaces. For example, the dead spaces can be filled during the assembly of the ball into the housing. In order for the valve to be able to work reliably, a certain gap must still remain between the ball and the filling material, and as a result, this gap can still clog up.

Furthermore, material forces its way from the dead spaces into the area between the spindle and the housing. Since the flow materials can be abrasive or sticky, or even materials which crystallize, it can be foreseen when an actuating of the spindle will become impossible.

In addition, particularly in the case of ball valves with large nominal diameters and in the case of high pressures, it is necessary to support the heavy ball with a step bearing. With the known ball bearings, the medium also gets into this region and clogs it.

It is therefore the object of the invention to configure a ball valve of the type described wherein penetration of medium into the dead spaces, and from there into the area of the spindle or a step bearing, is prevented right from the very start in order to increase the service life of the valve, as well as its operational reliability.

SUMMARY OF THE INVENTION

This object is achieved by placing additional annular seals which rest upon the surface of the ball in the housing in planes perpendicular to the spindle axis above and below the bore, as well as above and below the seals which are placed before and after the ball in the flow direction.

The two additional seals are placed in planes which are parallel with each other, yet perpendicular to the planes spanned by the sealing rings placed before and after the ball in the flow direction. When the ball is turned, these two additional seals thus rest in a permanent, sealing fashion, and prevent the medium, which flows between the sealing rings before and after the ball in the flow direction and the opening cutout of the ball bore when the valve is opened, from penetrating into the dead spaces which lie behind the additional seals. It is thus ensured that the dead spaces cannot clog up, so that any hindering of the closing and opening motion resulting from this cannot occur. It is a further advantage of the invention that the seals prevent the medium from pressing ahead into the spindle area or the step bearing area and, due to the clogging of them, restricting or making the spindle and ball impossible to move.

The ball valve in accordance with the invention has a design in which the dead spaces are minimized, which, in contrast to the filling and the use of bearing shells, is already an advantage from the point of view of manufacturing engineering. Unlike previous ball valves, they can also be designed to minimize the dead spaces even when metal sealing seats are used.

An additional advantage of the design in accordance with the invention can be seen in the many control possibilities resulting from the use of appropriate probes in the area between the ball seals which are adjacent to each other. The chamber which is delimited by the sealing seats which are adjacent to each other, the surface of the ball and the housing wall becomes filled with medium during the switching procedure. After the end positions have been reached, a rinsing procedure, an evacuation or something similar can be carried out by means of various connections. The minimized dead space is of great importance in that regard, since only small amounts of the conveyed medium have to be removed, and only small amounts of rinsing liquid contaminate the conveyed medium.

In addition, the control possibilities also pertain to the tightness of the seal per se, and to the pressure relationships and medium state between the sealing seats in the open position.

Probes and sensors can also be placed between the upper ball seal and the spindle seal which can provide information regarding possible leaks.

The bore in the ball can be configured as a blind-hole bores if the valve is merely part of a sample-taking system.

Other than that, the bore extends all the way through the ball unless a three-way valve is involved. In that case, the bore becomes correspondingly more complex.

The invention will be better understood by reference to the accompanying drawings taken in conjunction with the following discussion.

DETAILED DESCRIPTION OF THE PREFERRED EMBODIMENTS

Figure 1:
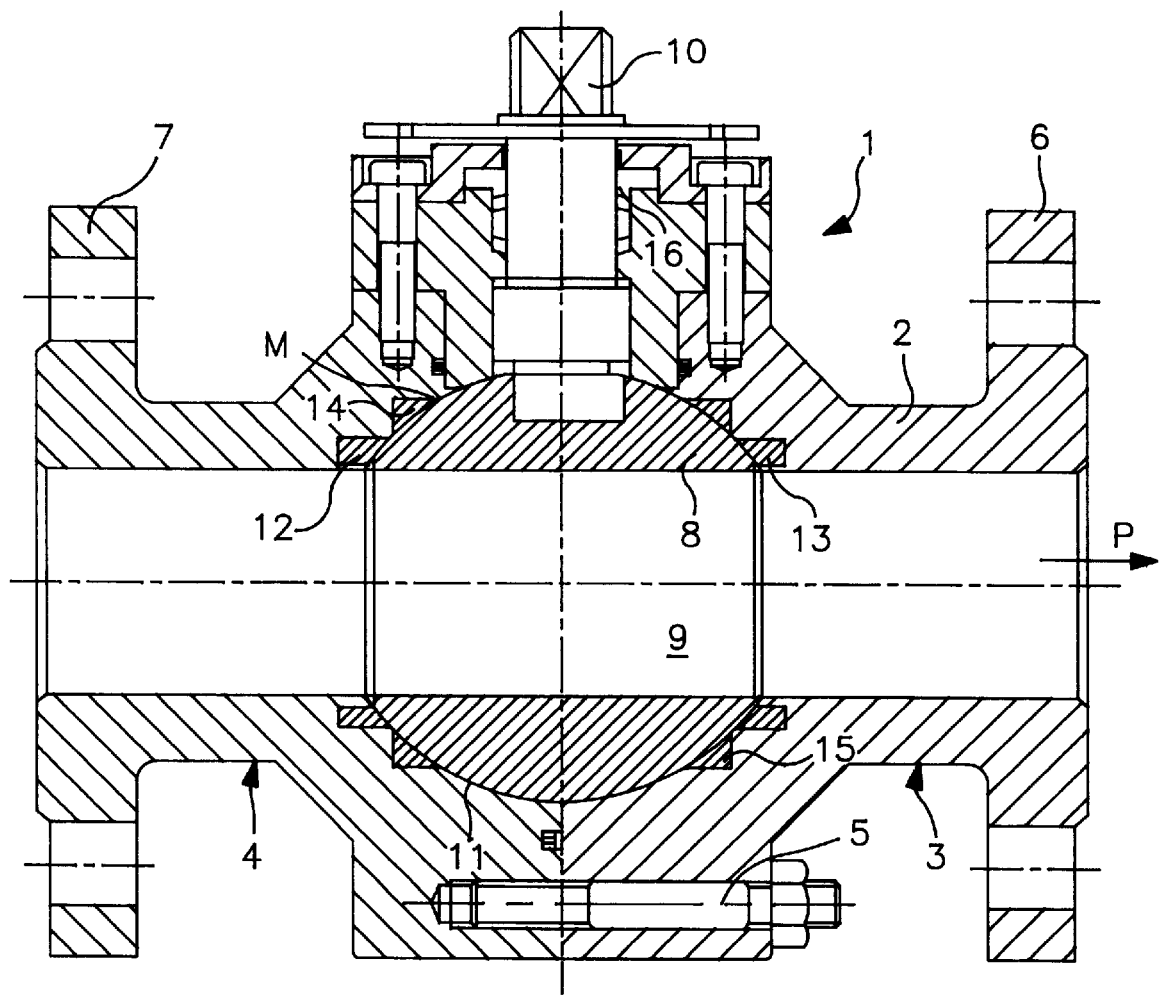
FIG. 1 shows a longitudinal section through a ball valve according to a preferred embodiment of the invention, the valve being in an open position.
Figure 2:
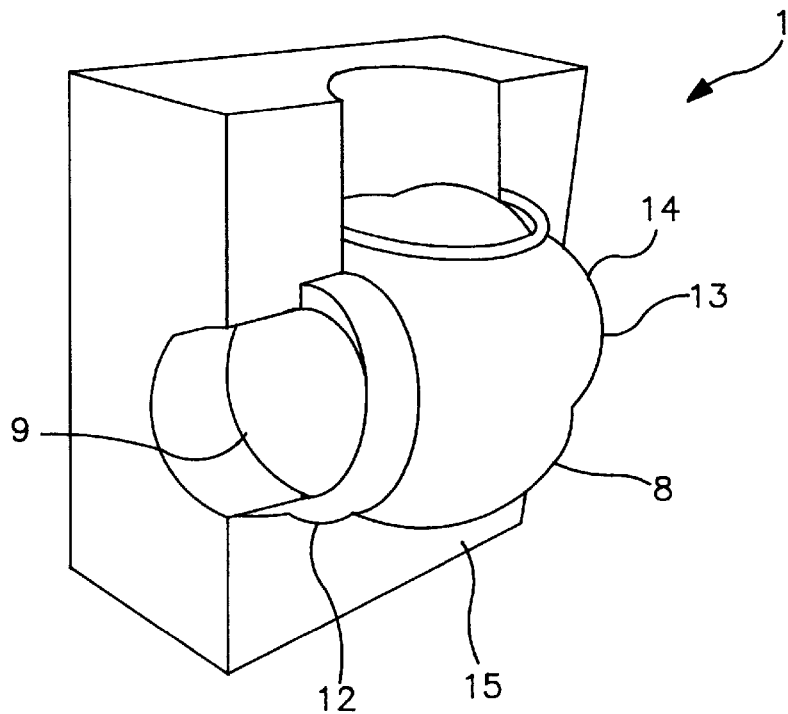
FIG. 2 shows a schematic perspective representation of the ball valve in accordance with FIG. 1 with sealing rings when the ball therein is in an open position.
Figure 3:
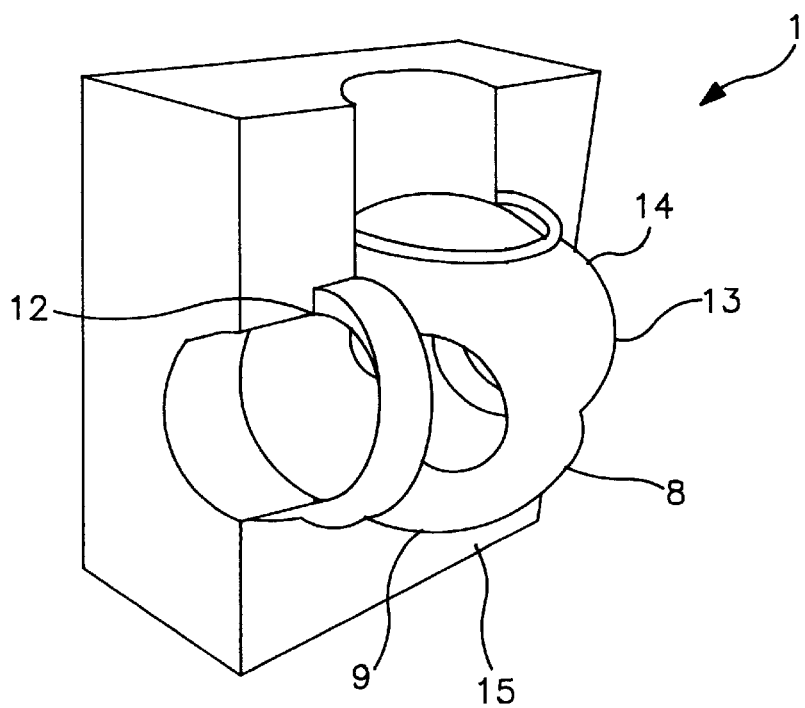
FIG. 3 is a similar view to FIG. 2 but where the ball is rotated to an intermediate position.

FIGS. 1–3 depict a ball valve 1 in accordance with a first embodiment of the present invention. It includes a split housing 2, the housing parts 3 and 4 of which are fastened to one another by means of screw bolts 5. Located at the two ends of the housing 2 are the flanges 6 and 7 to which the ends of the pipelines through which the conveyed medium flows are flange-mounted.

Inside the housing, a ball 8 is supported so it can rotate. The through-bore 9 in the ball 8 corresponds in diameter with the diameter of the pipeline.

Supported in the upper part of the housing 2 is a spindle 10 which is connected with the ball 8 in such a way that they turn together. For example, the spindle 10, and thus the ball 8, is rotated by means of a handgrip, not shown, on its free end. The dead spaces 11 between the ball 8 and the housing wall are reduced to a minimum. Placed in the housing 2 before and after the ball 8 in the flow direction P are sealing rings 12 and 13 which are arranged parallel to the flow front, that is, resting in a sealing fashion upon the ball surface when the ball valve 1 is in the closed position, just as they do when the valve is in the open position, i.e., when they concentrically surround the through-bore opening (FIG. 2).

In the intermediate positions between the open and closed positions (FIG. 3), these rings do, however, partially lose their effect and medium flows between the sealing ring 12 and the through-bore opening into the dead spaces 11 and clogs them. In addition, the medium forces its way from there to the spindle 10, and, when the ball 8 (especially with ball valves for large nominal diameters) is supported by means of a step bearing (see FIG. 4), all the way into the region of the bearing as well.

To prevent that, additional sealing rings 14 and 15 are placed in the housing 2 respectively above and below the sealing rings 12 and 13 and respectively above and below the through-bore in two planes which are parallel with one another, these planes being perpendicular to the planes defined by the sealing rings 12 and 13.

If now, in an intermediate position (FIG. 3), medium flows all the way through between sealing ring 12 and through-bore opening, it presses only as far as the sealing rings 14 and 15, which always have sealing contact with the ball surface at every switch position and all intermediate positions. Any additional pressing forward of the medium into the dead spaces, or even all the way to the spindle or the step bearing, is just about impossible.

As is prescribed by the Technical Guidelines for Air Pollution Control ("TA Luft"), an additional sealing ring 16 which is responsible for the sealing on the atmosphere side is located in the area of the spindle 10.

The choice of the sealing material is dependent upon the purposes and conditions of the individual application. Possibilities include metal and ceramic sealing systems, as well as soft-sealing (PTFE) systems.

Figure 4:
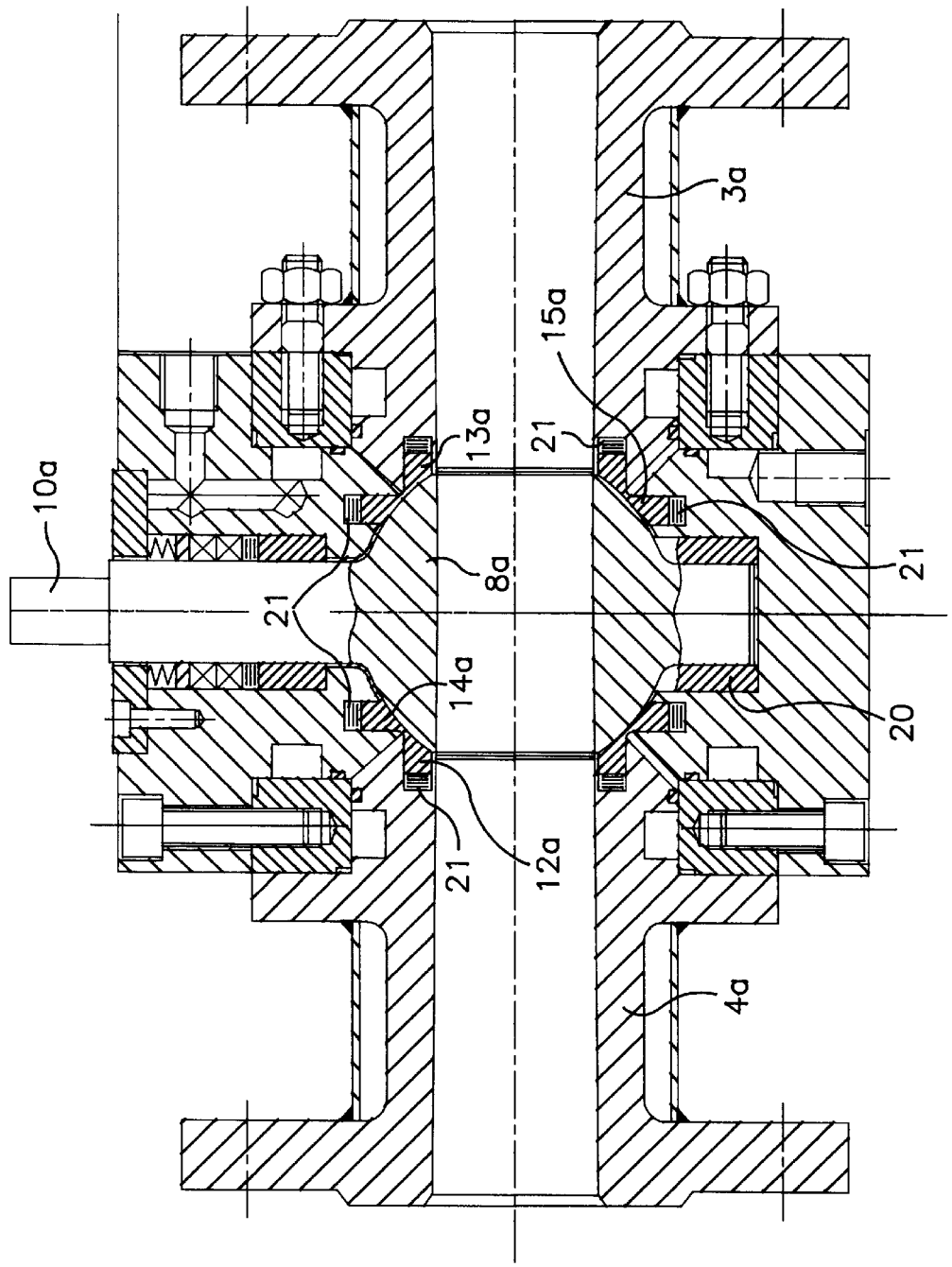
FIG. 4 shows a longitudinal section through an alternative embodiment of a ball valve according to the invention.

FIG. 4 shows an embodiment wherein the housing parts 4a, 5a which support ball 8a includes a step bearing 20 opposite the spindle 10a and sealing rings 12a, 13a, 14a and 15a are pressed towards ball 8a by springs 21.

Figure 5A:
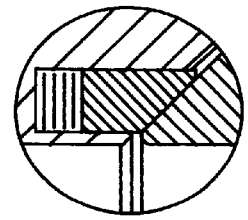
FIGS. 5a, 5b and 5c depict alternative embodiments of spring-supported directional rings.
Figure 5B:
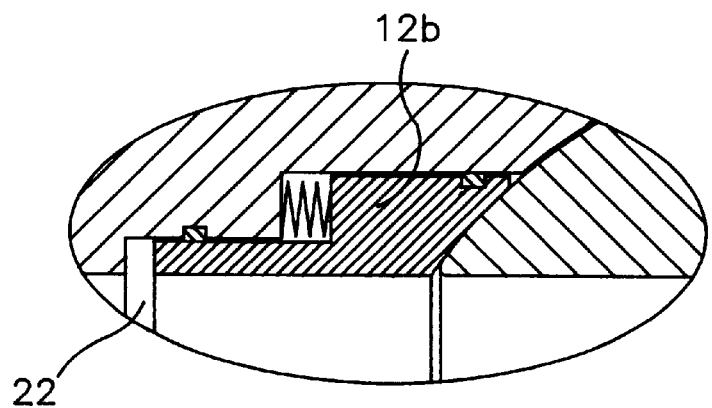
Figure 5C:
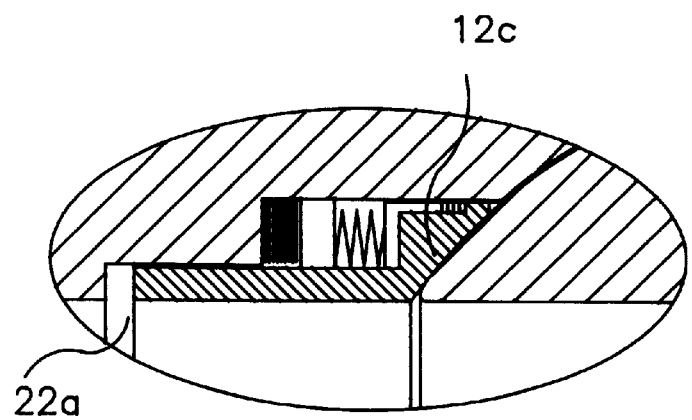

FIGS. 5a, 5b and 5c show alternative sealing ring and spring biasing configurations. FIG. 5a is adapted for pressures of less than 40 bar and temperatures less than 200° C., and FIGS. 5b and 5c, wherein the respective sealing rings 12b, 12c are supported by respective hydraulic ring supports 22, 22a, are adapted for high pressures and temperatures of less than 200° C. and more than 200° C., respectively.

Figure 6:
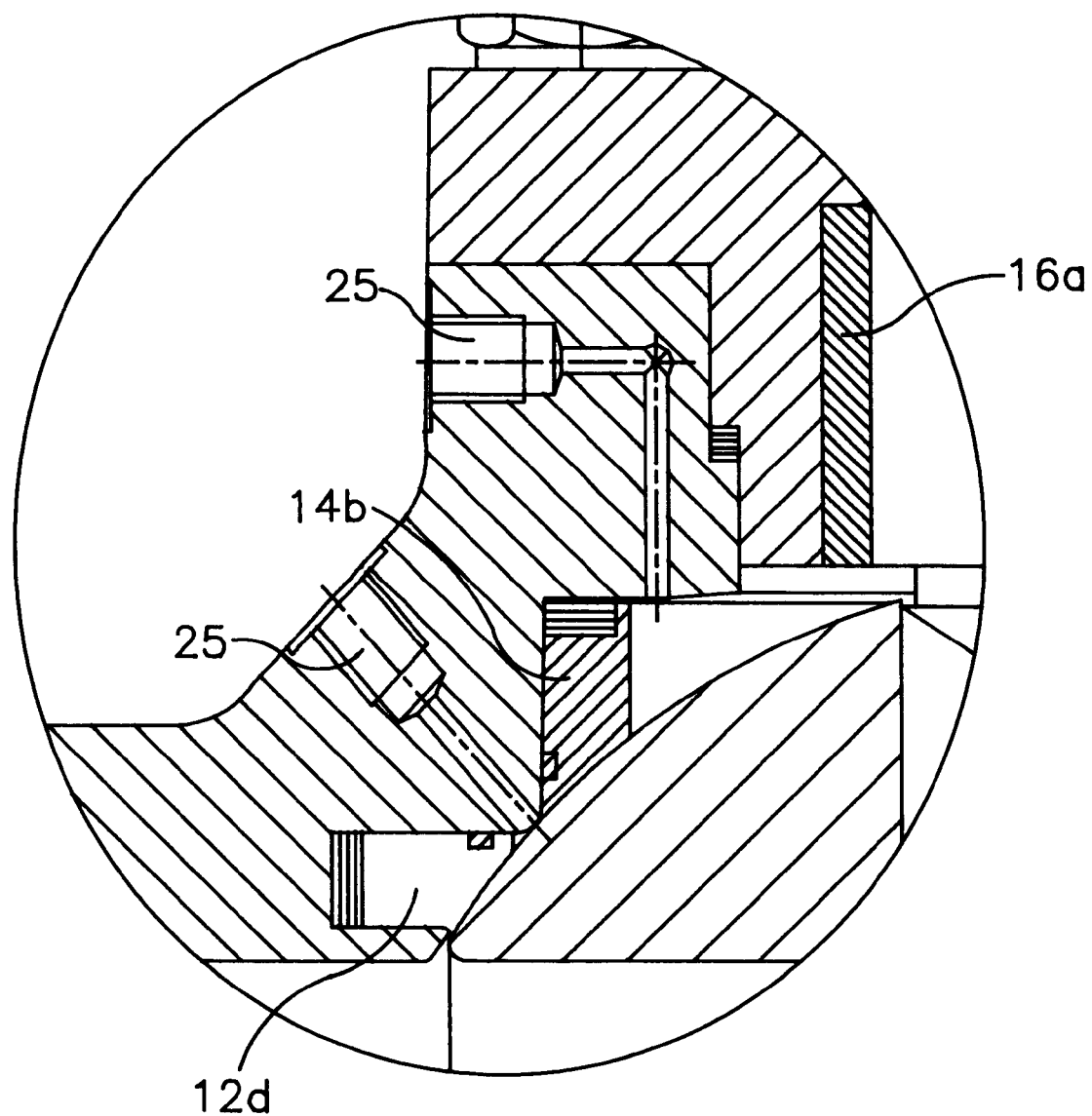
FIG. 6 depicts a portion of an embodiment of the inventive ball valve with control probes.

FIG. 6 shows a portion of an embodiment which includes control probes 25 between the sealing rings 12d and 14b and between the sealing ring 14b and the sealing ring 16a.

Figure 7:
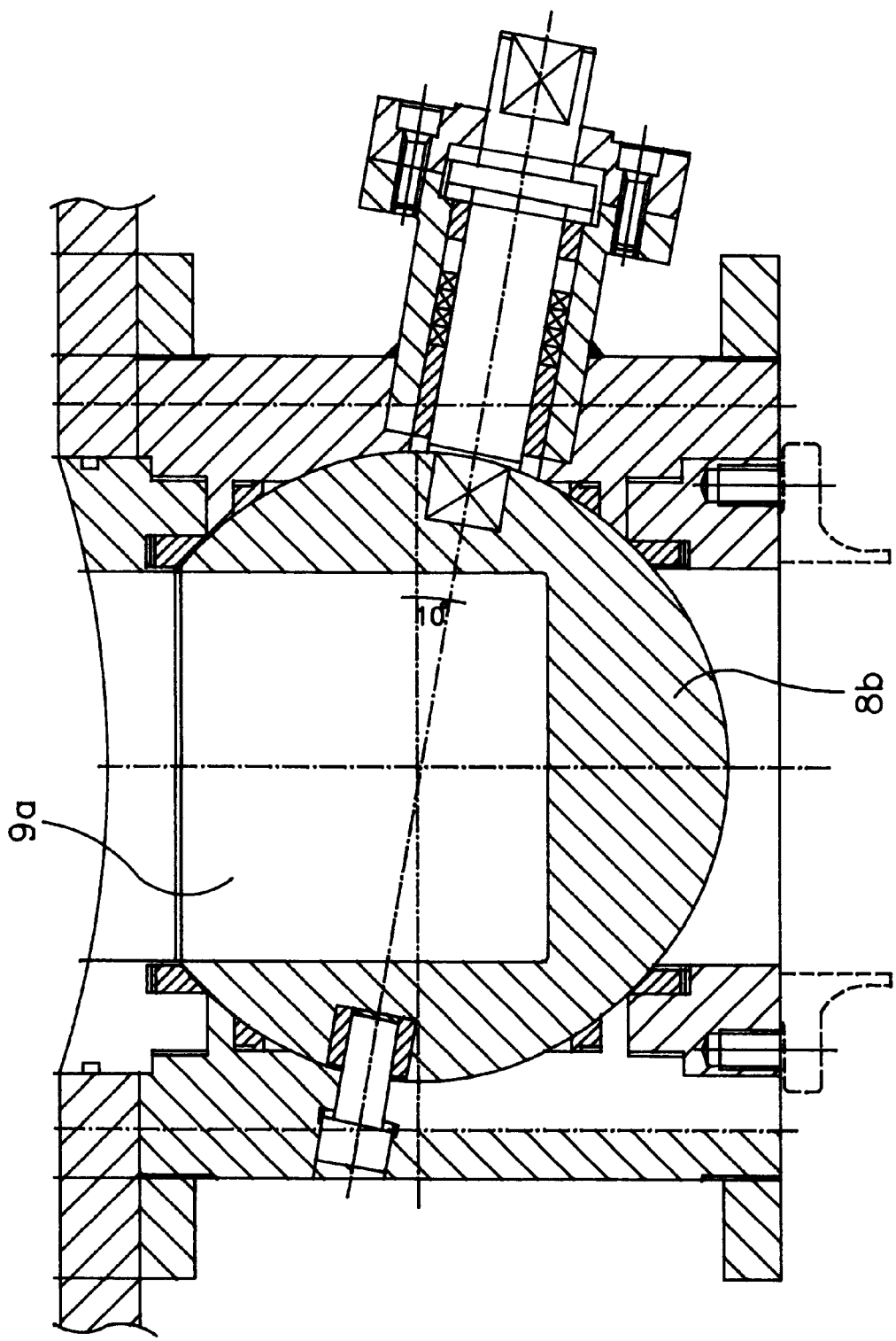
FIG. 7 depicts an embodiment wherein the bore in the ball of the ball valve is a blind bore.
Figure 2:
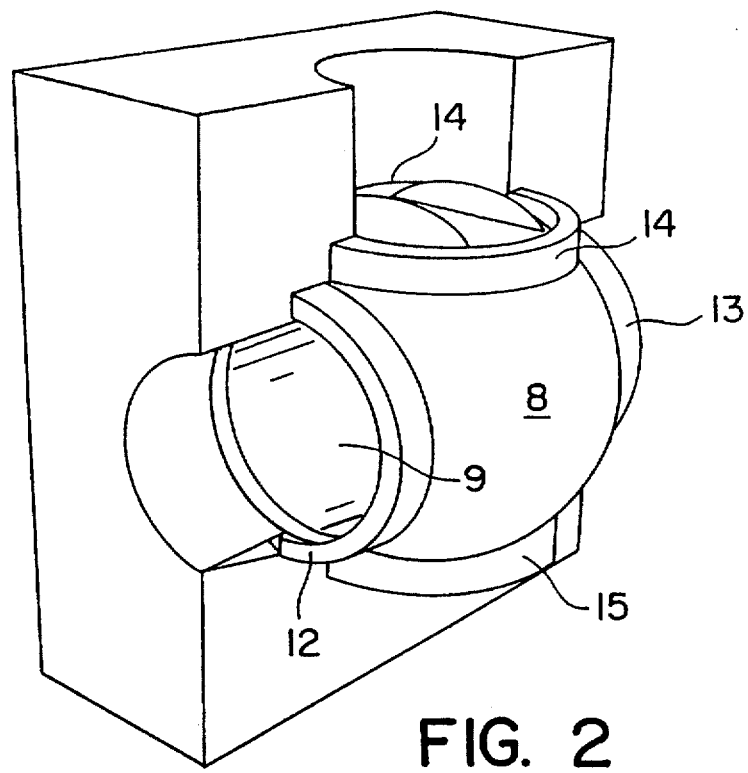
Figure 3:
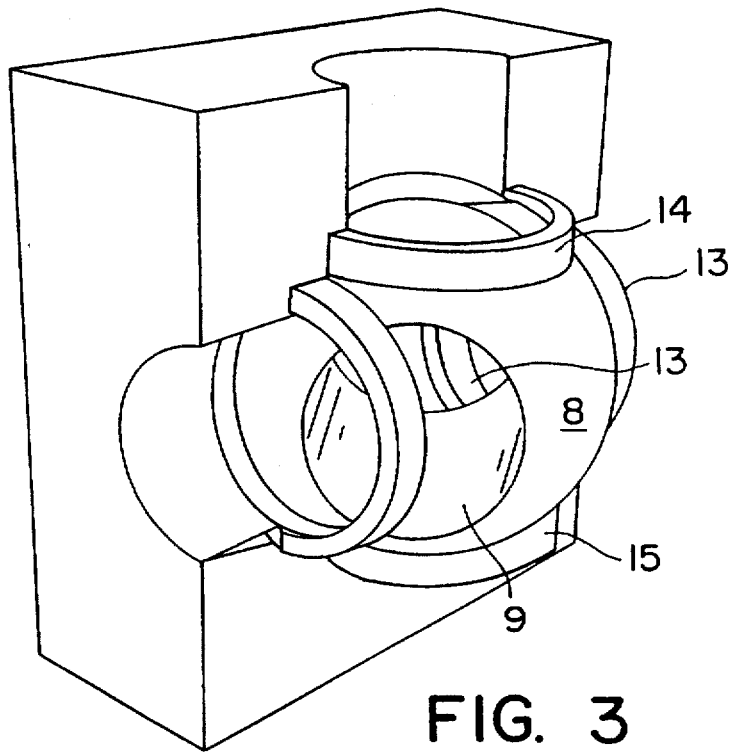

FIG. 7 shows an embodiment wherein the ball 8b of the ball valve, instead of having a through bore, has a blind bore 9a.

Although various embodiments of the invention have been shown and described, modifications therein can be made and still fall within the scope of the appended claims.

I claim:

1. A ball valve for shutting off pipelines carrying liquid, gaseous and solids-laden media, particularly those of large nominal diameters, consisting of a housing which defines a passageway therethrough for the flow of media therethrough, a ball having a bore therethrough supported in a rotatable fashion in the housing by means of a spindle defining an axis so as to open or close said passageway; first and second annular sealing rings respectively positioned in the housing, before and after the ball in a direction of media flow through the housing so as to seal off an inlet side from the outlet side of the ball;

third and fourth sealing rings positioned in the housing to annularly rest upon a surface of the ball, one in each of planes perpendicular to the spindle axis above and below the bore, as well as respectively above and below the first and second sealing rings, in such a way that each of the planes which are spanned by said third and fourth annular sealing rings and are parallel with each other are perpendicular to the planes spanned by the first and second sealing rings, said third and fourth sealing rings defining zeniths respectively adjacent said first and second sealing rings, and said first, second, third and fourth sealing rings being made of a material selected from the group consisting of hard metal, ceramic and carbon.

2. A ball valve in accordance with claim 1, including a fifth sealing ring in said housing around said spindle and above said third sealing ring.

3. A ball valve in accordance with claim 1, including a step bearing in the housing supporting the ball on a side thereof opposite the spindle.

4. A ball valve in accordance with claim 1, including respective spring means to press the first and second sealing rings against the ball surface.

5. A ball valve in accordance with claim 1, including control probes placed in an area between the sealing rings.

6. A ball valve in accordance with claim 1, wherein the bore in the ball is a blind hole.

7. A ball valve in accordance with claim 1, wherein the bore extends completely through said ball.

* * * * *

UNITED STATES PATENT AND TRADEMARK OFFICE
CERTIFICATE OF CORRECTION

Page 1 of 2

PATENT NO. : 5,927,687
DATED : July 27, 1999
INVENTOR(S) : Ralf KRAUSE

It is certified that error appears in the above-identified patent and that said Letters Patent is hereby corrected as shown below:

IN THE DRAWINGS

Delete Drawing Sheet 2, and substitute therefor the Drawing Sheet, consisting of FIGS. 2 and 3, as shown on the attached page.

Signed and Sealed this

Twenty-first Day of December, 1999

Attest:

Q. TODD DICKINSON

Attesting Officer          Acting Commissioner of Patents and Trademarks